United States Patent
Cheng et al.

(10) Patent No.: US 11,385,658 B2
(45) Date of Patent: Jul. 12, 2022

(54) VIDEO PROCESSING METHOD, DEVICE, AIRCRAFT, AND SYSTEM

(71) Applicant: SZ DJI TECHNOLOGY CO., LTD., Shenzhen (CN)

(72) Inventors: Long Cheng, Shenzhen (CN); Guanhua Su, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 241 days.

(21) Appl. No.: 16/747,970

(22) Filed: Jan. 21, 2020

(65) Prior Publication Data

US 2020/0162682 A1    May 21, 2020

Related U.S. Application Data

(63) Continuation of application No. PCT/CN2017/095341, filed on Jul. 31, 2017.

(51) Int. Cl.
| | |
|---|---|
| H04N 5/225 | (2006.01) |
| G05D 1/10 | (2006.01) |
| H04N 5/232 | (2006.01) |
| G06T 3/20 | (2006.01) |
| G06T 3/40 | (2006.01) |
| H04N 5/28 | (2006.01) |

(52) U.S. Cl.
CPC .............. *G05D 1/101* (2013.01); *G06T 3/20* (2013.01); *G06T 3/40* (2013.01); *H04N 5/23203* (2013.01); *H04N 5/23299* (2018.08); *H04N 5/28* (2013.01)

(58) Field of Classification Search
None
See application file for complete search history.

(56) References Cited

U.S. PATENT DOCUMENTS

| | | | |
|---|---|---|---|
| 10,642,271 B1 * | 5/2020 | Graber | .................. G02B 15/16 |
| 2003/0066932 A1 | 4/2003 | Carroll | |
| 2004/0189831 A1 | 9/2004 | Shibatani et al. | |

(Continued)

FOREIGN PATENT DOCUMENTS

| | | |
|---|---|---|
| CN | 104796611 A | 7/2015 |
| CN | 104954668 A | 9/2015 |

(Continued)

OTHER PUBLICATIONS

The World Intellectual Property Organization (WIPO) International Search Report for PCT/CN2017/095341 dated Apr. 28, 2018 7 Pages.

*Primary Examiner* — Timothy J Henn
*Assistant Examiner* — Dwight Alex C Tejano
(74) *Attorney, Agent, or Firm* — Anova Law Group, PLLC

(57) ABSTRACT

A video processing method includes receiving a video to be edited including a target object and shot by a photographing device mounted at an aircraft, determining a first video frame from the video to be edited, determining a display area of the target object in the first video frame, and obtaining a target video including performing an adjustment processing on an image position of the target object in a second video frame of the video to be edited according to the display area. The image position of the target object in the second video frame after being adjusted is the same as an image position of the display area in the first video frame.

17 Claims, 9 Drawing Sheets

(56) References Cited

U.S. PATENT DOCUMENTS

| | | | | |
|---|---|---|---|---|
| 2009/0059061 A1* | 3/2009 | Yu | ............... | H04N 5/232945 |
| | | | | 348/347 |
| 2013/0135510 A1* | 5/2013 | Lee | ............ | H04N 5/232935 |
| | | | | 348/333.02 |
| 2015/0179219 A1* | 6/2015 | Gao | ............ | G06T 7/254 |
| | | | | 386/278 |
| 2017/0180636 A1 | 6/2017 | Li | | |
| 2017/0272661 A1* | 9/2017 | Tsubusaki | ........ | H04N 5/232123 |
| 2017/0374277 A1* | 12/2017 | Dobashi | ............ | H04N 5/23299 |

FOREIGN PATENT DOCUMENTS

| | | |
|---|---|---|
| CN | 105141895 A | 12/2015 |
| CN | 105554480 A | 5/2016 |
| CN | 105830009 A | 8/2016 |
| CN | 105938369 A | 9/2016 |
| CN | 106375682 A | 2/2017 |
| CN | 106708092 A | 5/2017 |

\* cited by examiner

VIDEO PROCESSING METHOD, DEVICE, AIRCRAFT, AND SYSTEM

CROSS-REFERENCE TO RELATED APPLICATION

This application is a continuation of International Application No. PCT/CN2017/095341, filed on Jul. 31, 2017, the entire content of which is incorporated herein by reference.

TECHNICAL FIELD

The present disclosure relates to the field of control and, more particularly, to a video processing method and device, an aircraft, and a system.

BACKGROUND

With the development of electronic technologies and image processing technologies, people shoot videos using various electronic devices. Videos obtained by various electronic devices are edited into a video with certain effects through applications, for example, Photoshop (image processing software).

The conventional video processing method is generally as follows. A user obtains the video to be edited shot by the various electronic devices and loads the video to be edited into the application such as Photoshop. Then, the user edits the video to be edited through tools provided by the application software to obtain the video that the user wants to achieve. How to better edit the video has become a research hotspot.

SUMMARY

In accordance with the disclosure, there is provided a video processing method including receiving a video to be edited including a target object and shot by a photographing device mounted at an aircraft, determining a first video frame from the video to be edited, determining a display area of the target object in the first video frame, and obtaining a target video including performing an adjustment processing on an image position of the target object in a second video frame of the video to be edited according to the display area. The image position of the target object in the second video frame after being adjusted is the same as an image position of the display area in the first video frame.

Also in accordance with the disclosure, there is provided a video processing method including receiving a flight control instruction indicating a flight mode of an aircraft and indicating a target object, responding to the flight control instruction, controlling the aircraft to fly in the flight mode and controlling a photographing device mounted at the aircraft to shoot a video of the target object, and returning the video shot by the photographing device in the flight mode. During shooting of the video, an attitude of the photographing device is controlled to maintain a position of the target object unchanged in the video, and a flight trajectory of the aircraft is controlled to change a size of the target object in the video.

Also in accordance with the disclosure, there is provided a video processing method including a video processing device sending a flight control instruction indicating a flight mode of an aircraft and indicating a target object, and the aircraft responding to the flight control instruction to fly in the flight mode and control a photographing device mounted at the aircraft to shoot a video of the target object and returning the video shot by the photographing device in the flight mode. During shooting of the video, an attitude of the photographing device is controlled to maintain a position of the target object unchanged in the video, and a flight trajectory of the aircraft is controlled to change a size of the target object in the video. The method further includes the video processing device receiving the video, determining a first video frame from the video and a display area of the target object in the first video frame, and performing an adjustment processing on an image position of the target object in a second video frame of the video according to the display area to obtain a target video. The image position of the target object in the second video frame after being adjusted is the same as an image position of the display area in the first video frame.

BRIEF DESCRIPTION OF THE DRAWINGS

In order to provide a clearer illustration of technical solutions of disclosed embodiments, the drawings used in the description of the disclosed embodiments are briefly described below. It will be appreciated that the described drawings are some rather than all of the drawings of the present disclosure. Other drawings conceived by those having ordinary skills in the art on the basis of the described drawings without inventive efforts should fall within the scope of the present disclosure.

DETAILED DESCRIPTION OF THE EMBODIMENTS

Figure 1:
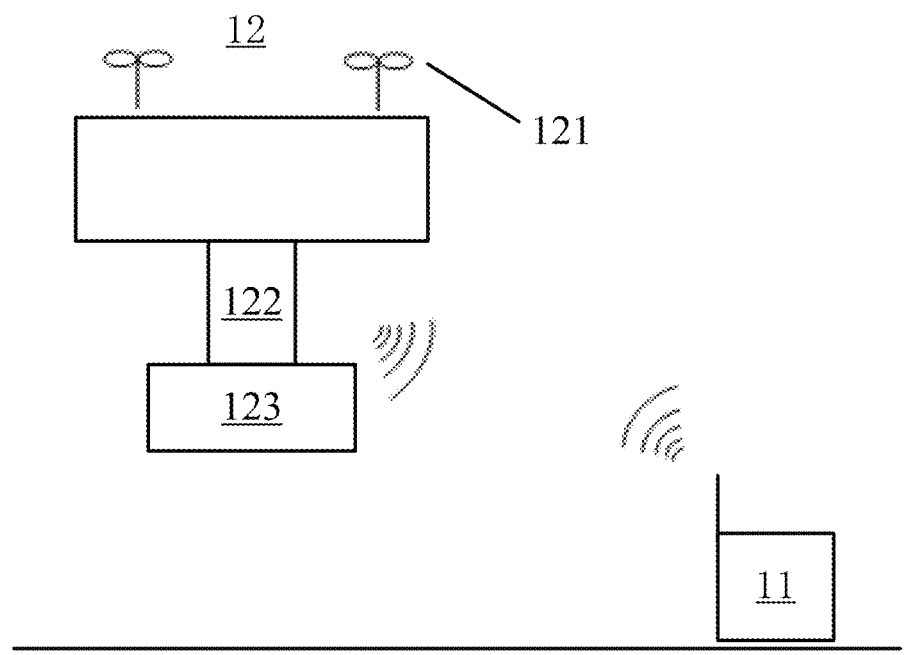
FIG. 1 is a schematic structural diagram of an unmanned aerial vehicle (UAV) system consistent with embodiments of the disclosure.

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings. Unless conflicting, the exemplary embodiments and features in the exemplary embodiments can be combined with each other.

In some embodiments, a video processing method consistent with the disclosure may be implemented by a video processing device. In some embodiments, the video processing method may be applied to an aircraft, for example, an unmanned aerial vehicle (UAV). Hereinafter, the video processing method for an aircraft will be described in detail below.

The method consistent with the disclosure does not need to use a remote controller to control a composition of captured image video during a whole flight of the aircraft or manually perform the post-processing on the captured image video. After the aircraft takes off, a mobile zoom shooting mode can be entered via an application (App) on the video processing device to shoot a target video. In some embodiments, during the flight of the aircraft, a gimbal can be adjusted to follow the target object by using the mobile zoom shooting mode. As such, a photographing device of the aircraft can shoot the target object by following the target object, and a display area of the target object on an image frame shot by the photographing device can be determined, such that a position of the target object in the display area can be maintained. Therefore, an editable video can be obtained.

In some embodiments, after it is determined that the photographing device follows the target object to shoot and the target object exists in the display area, and when a click operation of an action execution button on an application (App) is received, a flight control instruction can be generated, and the flight control instruction can be sent to the aircraft. The flight control instruction generated after the click operation can be used to control the aircraft to move in a direction away from the target object for shooting, or to move in a direction towards the target object for shooting. The video processing device may also be referred to as a terminal. The aircraft sends the video to be edited shot by the photographing device to the terminal in real time, such that the terminal can receive the video to be edited. In some embodiments, after the aircraft shoots and captures the full video, the full video can be used as the video to be edited and sent to the terminal. In some embodiments, the video shot by the photographing device may be sent to the terminal by the photographing device itself.

The terminal can determine a first video frame (also referred to as a "reference video frame") from the video to be edited, and determine the display area of the target object in the first video frame. The terminal can adjust a position of the target object in a second video frame (also referred to as a "video frame to be adjusted" or a "target video frame") of the video to be edited according to the display area to obtain the target video. The image position of the target object located in the adjusted second video frame can be the same as the image position of the display area in the first video frame.

In some embodiments, the video to be edited that needs to be edited by the terminal may be not a video shot by the photographing device of the aircraft, and a plurality of the acquisition scenes of the video to be edited can be included. In some embodiments, the video to be edited can be a video shot by a camera mounted at a mobile robot. In some other embodiments, the video to be edited can be a video of another user or object (such as a tree, a statue, or the like) captured by a user through a device having a camera function, such as a smartphone.

FIG. 1 is a schematic structural diagram of an example unmanned aerial vehicle (UAV) system consistent with the disclosure. As shown in FIG. 1, the system includes a video processing device 11 and a UAV 12. The video processing device 11 may include a control terminal of the UAV 12, and may include one or more of a remote controller, a smartphone, a tablet computer, a laptop computer, a ground station, a wearable device (e.g., a watch, a bracelet, or the like), and the like. The UAV 12 can include a rotary-wing UAV, such as a quad-rotor UAV, a six-rotor UAV, or an eight-rotor UAV, or can include a fixed-wing UAV. The UAV 12 includes a power system 121 configured to provide a flight power for the UAV 12. The power system 121 can include one or more of a propeller, a motor, and an electronic speed control (ESC). The UAV 12 further includes a gimbal 122 and a photographing device 123 mounted at a main body of the UAV 12 through the gimbal 122. The photographing device 123 can be configured to shoot images or videos during a flight of the UAV 12, and can include, but is not limited to, a multispectral imager, a hyperspectral imager, a visible light camera, an infrared camera, and the like. The gimbal 122 can include a multi-axis transmission and stabilization system. A motor of the gimbal 122 can compensate a shooting angle of the photographing device 123 by adjusting a rotation angle of a rotating shaft, and prevent or reduce a vibration of the photographing device 123 by setting an appropriate buffer mechanism.

In some embodiments, the video processing device 11 may include an interactive device configured to interact with the user. The interactive device may include one or more of a touch display screen, a keyboard, keys, a joystick, and a pulsator. The interactive device may include an App and a user interface, and the App can be displayed on the user interface. The App can display an electronic map, and the user can perform a click operation on the electronic map displayed on the App on the user interface of the video processing device 11. A point on the electronic map can be confirmed by performing the click operation once. After receiving at least two points confirmed by the click operation, the video processing device 11 can connect the at least two points to form a connection between the at least two points. A shooting trajectory formed by connecting the at least two points can be formed, such that the UAV 12 can be controlled to fly according to the shooting trajectory, and the photographing device 123 can perform the shooting according to the shooting trajectory. It can be appreciated that the click operation on the user interface is merely an example method for confirming the shooting trajectory, and the manner of confirming the shooting trajectory is not limited herein.

Figure 2:
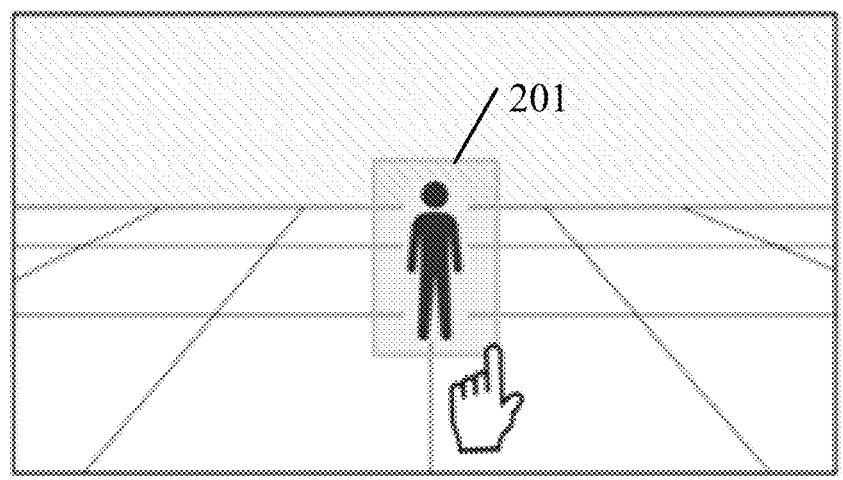
FIG. 2 schematically shows an interface for obtaining a target object from a preview image consistent with embodiments of the disclosure.
Figure 3:
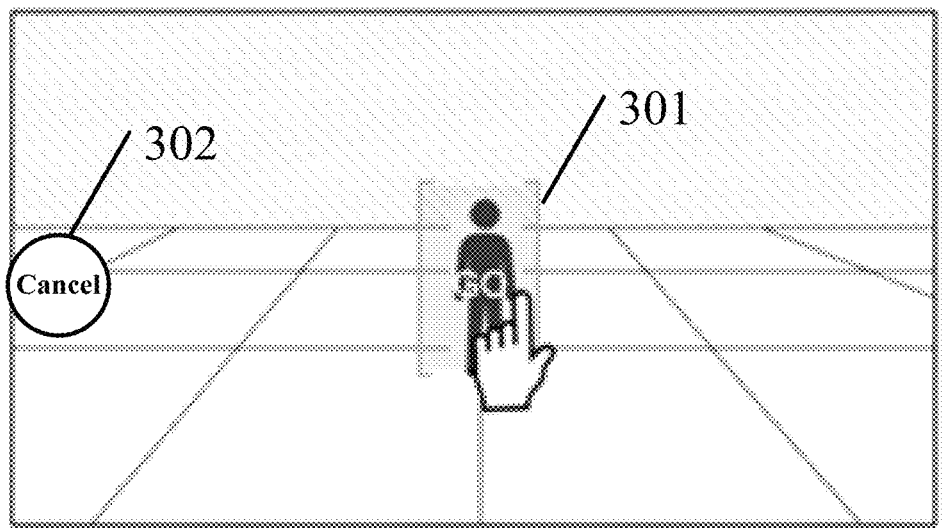
FIG. 3 schematically shows an interface for implementing a flight control instruction consistent with embodiments of the disclosure.

In some embodiments, before the video processing device 11 receives the video to be edited, the UAV 12 needs to shoot a preview image through the photographing device 123, and the video processing device 11 can determine the target object from the obtained preview image. The display area of the target object in the preview image can be determined by receiving a user operation. The video processing device 11 can send a flight control instruction to the UAV 12, such that the UAV 12 can respond to the flight control instruction to perform the shooting during the flight, and the photographing device 123 can obtain the video to be edited. The video to be edited can include the target object, and the position of the target object in the video to be edited can remain unchanged. FIG. 2 schematically shows an example interface for obtaining the target object from the preview image consistent with the disclosure. FIG. 3 schematically shows an example interface for implementing the flight control instruction consistent with the disclosure. As shown in FIG. 2, the user can select a region 201 on the preview image shot by the photographing device through a frame-selection operation of the target object. An image object in the region 201 can be used as the target object, and the display area of the target object can be determined. In some embodiments, the region selected by the frame-selection operation may be used as the display area of the target object.

In some embodiments, before the video processing device 11 receives the video to be edited, position information about a click operation on the target object in the preview image may be obtained. As shown FIG. 3, an execution button 301 (e.g., a "GO" button) on the interface can be configured to control the UAV 12 to implement the flight control instruction, and a cancel button 302 can be configured to cancel the display area of the currently selected target object. When it is detected that the user clicks the "GO" button 301 in FIG. 3, the video processing device 11 can control the UAV 12 to implement the flight control instruction, and control the photographing device 123 on the UAV 12 to shoot the target object. According to the position information of the click operation, the region 201 in FIG. 2 can be automatically selected, the image object in the region 201 can be used as the target object, and the display area of the target object can be determined. In some embodiments, the region selected according to the click operation may be used as the display area of the target object.

Figure 4:
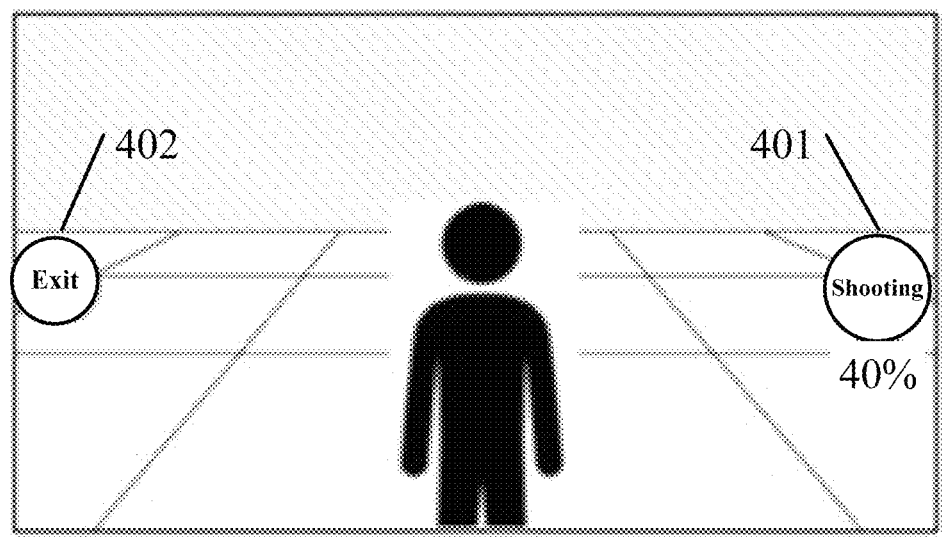
FIG. 4 schematically shows an interface for a shooting process consistent with embodiments of the disclosure.

FIG. 4 schematically shows an example interface for a shooting process consistent with the disclosure. As shown in FIG. 4, the interface has an icon 401 showing a shooting progress and an exit button 402. As shown in FIG. 4, the shooting process of the photographing device 123 has been completed by 40%. When an end of the shooting process is detected, the video processing device 11 can obtain the video to be edited.

In some embodiments, the video processing device 11 may obtain a size of the target object in each video frame of the video to be edited, and determine a video frame having a largest size of the target object as the first video frame.

In some embodiments, the video processing device 11 can determine a first one of a sequence of video frames (e.g., one of the sequence of video frames that is captured earliest) in the video to be edited as the first video frame, or determine a last one of the sequence of video frames in the video to be edited as the first video frame.

In some embodiments, the video processing device 11 may determine a size of the target object in the display area of the first video frame, and determine the size as a standard size. The target object in the second video frame can be scaled according to the standard size, and the image position of the target object in the second video frame after the scaling processing can be adjusted according to the position of the display area.

In some embodiments, after adjusting the image position of the target object in each second video frame, the video processing device 11 may adjust respective designated video frames in the target video in a reverse order according to a shooting time sequence. The video obtained after adjusting the time sequence can be determined as the target video.

Figure 5:
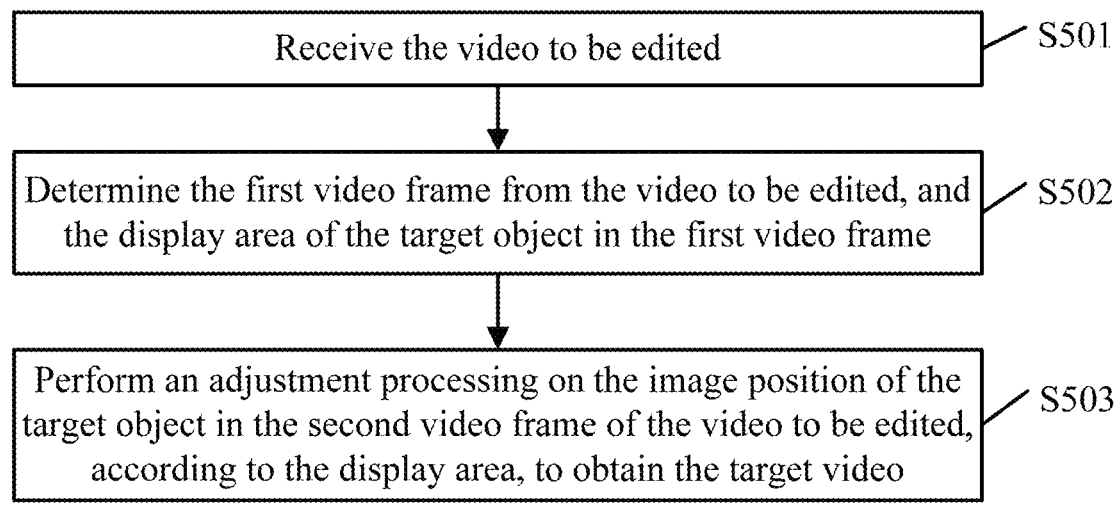
FIG. 5 is a schematic flow chart of a video processing method consistent with embodiments of the disclosure.

FIG. 5 is a schematic flow chart of an example video processing method consistent with the disclosure. The method can be implemented by a video processing device, for example, the video processing device 11 described above.

As shown in FIG. 5, at S501, the video to be edited is received. In some embodiments, the video to be edited refers to a video including the target object shot by the photographing device mounted at the aircraft, when the aircraft is in a specific flight mode. The position of the target object in each image of the video remains unchanged, and the size of the target object in each image can be changed. Before receiving the video to be edited, the video processing device can obtain the preview image shot by the photographing device mounted at the aircraft, and obtain the target object from the obtained preview image.

In some embodiments, the video processing device can receive the frame-selection operation on the target object on the preview image. The preview image was shot by the photographing device mounted at the aircraft. A target frame-selection region can be determined according to the frame-selection operation. In the video to be edited shot by the photographing device during the flight of the aircraft, the target object can be within the target frame-selection region. For example, the video processing device can control the photographing device mounted at the aircraft to shoot, and control the gimbal to face the target object, such that the photographing device can shoot the preview image. Based on the user's frame-selection operation on the target object in the preview image on the user interface of the video processing device, the target frame-selection region of the target object can be determined from the obtained preview image. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's frame-selection operation on the target object in the preview image on the user interface of the video processing device, the image region 201 determined by the frame-selection operation can be used as the target frame-selection region of the target object.

It can be appreciated that the frame-selection operation is merely an example of the operation performed by the user on the target object in the preview image on the user interface of the video processing device. The user's operation on the target object in the preview image on the user interface of the video processing device may include other operations. The user's operation on the target object in the preview image on the user interface of the video processing device is not limited herein.

In some embodiments, the video processing device can obtain the position information of the click operation on the target object in the preview image. The preview image can be shot by the photographing device mounted at the aircraft, and the target frame-selection region can be determined based on the position information of the click operation. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's click operation on the target object in the preview image on the user interface of the video processing device, the position information of the click operation can be obtained. According to the position information of the click operation, the target frame-selection region 201 can be determined as the target frame-selection region of the target object. In the video to be edited shot by the photographing device during the flight of the aircraft, the target object can be within the target frame-selection region.

In some embodiments, the video processing device can obtain the video to be edited shot by the photographing device during a movement of the aircraft. For example, the video processing device can control the movement of the aircraft mounted with the photographing device by obtaining a shooting instruction, and shoot the video to be edited during the movement. Referring again to FIG. 3, after the user interface of the video processing device obtains the target object, the execution button "GO" 301 shown in FIG. 3 and the cancel button 302 shown in the FIG. 3 can appear on the user interface. When the video processing device receives a user's click on the execution button "GO", the video processing device can obtain the shooting instruction. As such, the aircraft mounted with the photographing device can be controlled to move, and the video to be edited can be obtained during the movement of the aircraft.

In some embodiments, the video processing device can control the aircraft mounted with the photographing device to control the movement of the aircraft according to a preset movement rule, such that the photographing device can shoot the video. Thereby, the video processing device can obtain the video to be edited shot by the photographing device during the movement of the aircraft. The preset movement rule can include controlling the movement of the aircraft by determining one or two of a shooting start position and a shooting end point position.

In some embodiments, the video processing device may control the aircraft to move from a current position to the shooting end point position by determining the shooting end point position. For example, the video processing device can determine the shooting end point position and control the aircraft to move from the current position to the shooting end point position. The shooting end point can be in a direction away from the target object.

In some embodiments, the video processing device may control the aircraft to move from the shooting start position to the shooting end position by determining the shooting start position and the shooting end position. The video processing device may receive a first position selection operation and determine the shooting starting position according to the first position selection operation. The video processing device may receive a second position selection operation, and determine the position of the shooting end point according to the second position selection operation. It can be appreciated that the first position selection operation or the second position selection operation may include a position selection operation similar to the click operation, which is not limited herein.

In some embodiments, during the movement of the aircraft, if the video processing device receives the user operation, the current position of the aircraft can be determined as the position of the shooting end point. For example, during the movement of the aircraft, the photographing device can implement the shooting instruction during the movement of the aircraft. If the video processing device receives the user's click operation, the video processing device can determine the current position of the aircraft as the position of the shooting end point, and control the photographing device mounted at the aircraft to stop shooting. The user operation may include an operation, for example, a click operation, a slide operation, or the like, which is not limited herein.

At S502, the first video frame is determined from the video to be edited, and the display area of the target object in the first video frame is determined. In some embodiments, the video processing device may determine the first video frame from the video to be edited, and determine the display area of the target object in the first video frame. For example, the video processing device can determine the position information of the display area of the target object in the preview image from the obtained preview image. The position information can include one or more pieces of information, for example, size, area, coordinate information, a ratio of the target object to the preview image, and the like. The preview image can be obtained by the video processing device by controlling the photographing device mounted at the aircraft to shoot. The target object can be obtained by the video processing device from the obtained preview image based on the user's operation on the user interface of the video processing device. Referring again to FIG. 2, for example, the video processing device can determine that the region 201 is 10 cm in length and 15 cm in width based on the obtained region 201 used as the target object.

In some embodiments, the video processing device may determine the video frame having the largest size of the target object as the first video frame by obtaining the size of the target object in each video frame in the video to be edited. For example, the video processing device can obtain that the sizes of the target object in the video frames in the video to be edited are 25 cm$^2$, 30 cm$^2$, 40 cm$^2$, and 50 cm$^2$, and determine the video frame with the largest size 50 cm$^2$ of the target object as the first video frame.

In some embodiments, the video processing device may determine the first one of the sequence of video frames in the video to be edited as the first video frame, or determine the last one of the sequence of video frames in the video to be edited as the first video frame. It can be appreciated that the display area of the target object in the first video frame can be determined according to the position of the target frame-selection region.

At S503, an adjustment processing is performed on the image position of the target object in the second video frame of the video to be edited according to the display area, to obtain the target video. In some embodiments, the video processing device may adjust the image position of the target object in the second video frame of the video to be edited according to the display area, to obtain the target video.

In some embodiments, the video processing device may determine the size of the target object in the display area of the first video frame, set the size as the standard size, and perform a scaling processing on the target object in the second video frame according to the standard size. The video processing device may perform the adjustment processing on the image position of the target object in the second video frame after the scaling processing according to the position of the display area. In some embodiments, the video processing device may perform the scaling processing on the entire image area of the second video frame according to the standard size.

In some embodiments, the video frame having the largest target object in the video to be edited can be determined as the first video frame, and the size of the target object can be set as the standard size. The other video frames can be determined as the second video frames. The video processing device can enlarge the entire image area of each second video frame in the video to be edited according to the standard size, and cut off an edge area of each enlarged second video frame, such that the size of each second video frame after being clipped can be the same as the size of the first video frame. The position of the target object and area occupied by the target object in each second video frame after being clipped are the same as the position of the target object and the area of the target object in the first video frame. It can be appreciated that "same" as used in this disclosure allows errors within a certain range.

In some embodiments, after adjusting the image position of the target object in each second video frame, the video processing device may adjust the time sequence of respective designated video frames in the video to be edited according to a preset adjustment rule. The video obtained after adjusting the time sequence can be determined as the target video.

In some embodiments, the video to be edited can be shot when the aircraft flies in a direction away from the target object. Each designated video frame in the video to be edited can be adjusted in a reverse order according to the shooting time sequence.

In some embodiments, the video processing device may send the flight control instruction to the aircraft, and the flight control instruction can be implemented to control the aircraft to fly. The flight control instruction can include an instruction for controlling the aircraft to move in the direction away from the target object, or the flight control instruction can include an instruction for controlling the aircraft to move in the direction toward the target object.

In some embodiments, the video processing device may perform the adjustment processing on the designated video frames in the obtained video to be edited to obtain the target video. The designated video frames can include some or all of the video frames to be edited. For example, after obtaining the video to be edited, the video processing device may select some video frames from the video to be edited as the designated video frames. The selection method is not limited herein. In some embodiments, all of the video frames from the video to be edited may be used as the designated video frames, such that the video processing device can perform the adjustment processing on the obtained designated video frames to obtain the target video.

Figure 6:
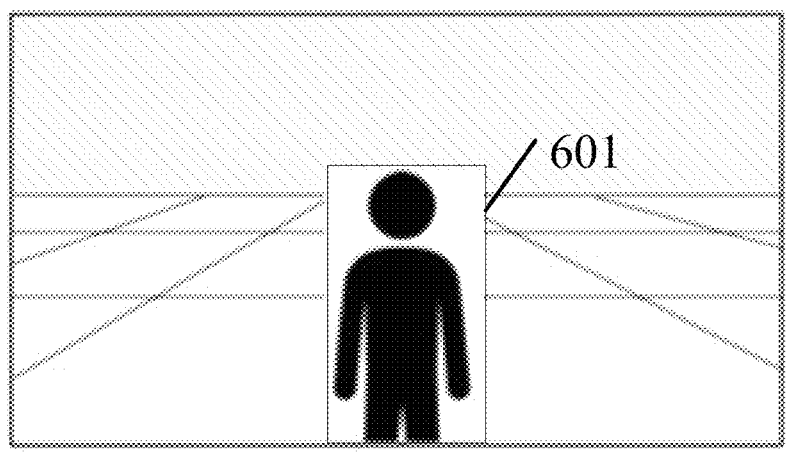
FIG. 6 schematically shows an interface for a designated video frame consistent with embodiments of the disclosure.
Figure 7:
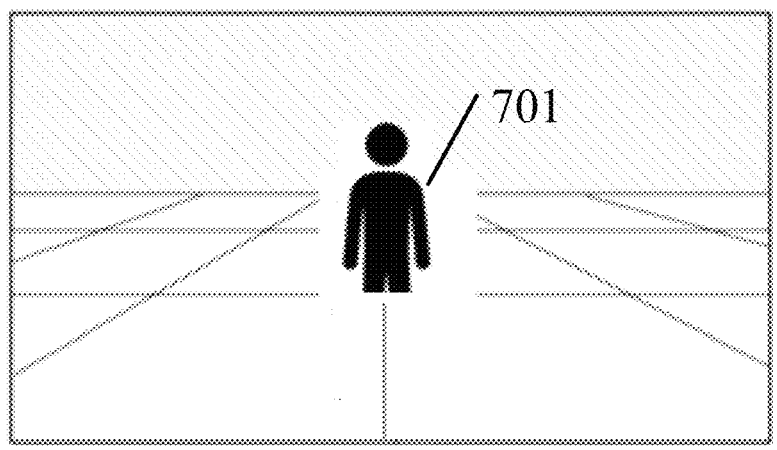
FIG. 7 schematically shows an interface for another designated video frame consistent with embodiments of the disclosure.
Figure 8:
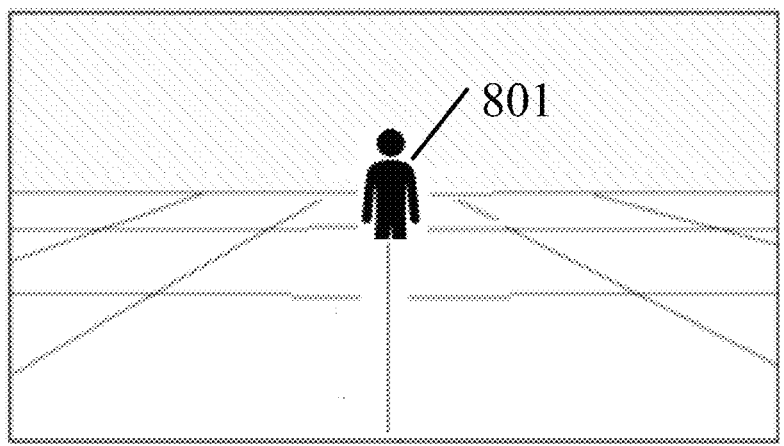
FIG. 8 schematically shows another interface for another designated video frame consistent with embodiments of the disclosure.
Figure 9:
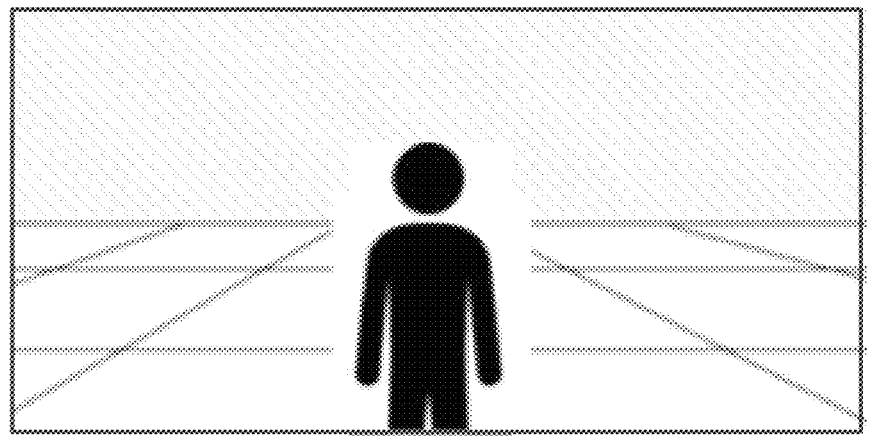
FIG. 9 schematically shows an interface for enlarging a designated video frame consistent with embodiments of the disclosure.
Figure 10:
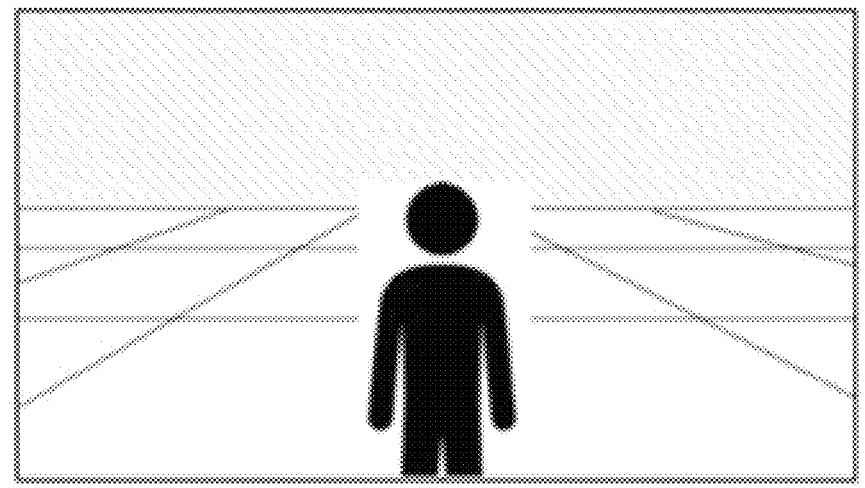
FIG. 10 schematically shows another interface for enlarging a designated video frame consistent with embodiments of the disclosure.

FIG. 6 schematically shows an example interface for the designated video frame consistent with the disclosure. FIG. 7 schematically shows another example interface for the designated video frame consistent with the disclosure. FIG. 8 schematically shows another example interface for the designated video frame consistent with the disclosure. FIG. 9 schematically shows an example interface for enlarging the designated video frame consistent with embodiments of the disclosure. FIG. 10 schematically shows another interface for enlarging the designated video frame consistent with the disclosure.

The interface shown in FIG. 6 shows the first video frame obtained by the video processing device and the reference numeral 601 represents the display area of the obtained target object in the preview image. The interface shown in FIG. 7 shows the second video frame obtained by the video processing device, and the interface shown in FIG. 8 shows a third video frame obtained by the video processing device. The video frames in FIGS. 6 to 8 can be the video frames shot by the photographing device during the flight when the video processing device send the flight control instruction to the aircraft. The flight control instruction can include the instruction for controlling the aircraft to move in the direction away from the target object, or the flight control instruction can include the instruction for controlling the aircraft to move in the direction toward the target object. The video processing device can obtain the target video by performing the adjustment processing on the three video frames.

In some embodiments, after the video processing device obtains the designated video frames from the video to be edited, the target object may be determined in each designated video frame in the video to be edited, and the enlargement processing can be performed on each designated video frame. The target object can be located in a target image region in each designated video frame after the enlargement process. For example, the video processing device can obtain the designated video frame shown in FIG. 7 from the video to be edited, and the video processing device can determine the target object 701 in the designated video frame shown in FIG. 7. The display area 601 of the target object in the preview image shown in FIG. 6 can be set as the target image region, and the enlargement processing can be performed on the designated video frame in FIG. 7, such that the target object 701 can be located in the target image region of the designated video frame after the enlargement processing to obtain the video frame shown in FIG. 9.

In some embodiments, after obtaining the designated video frames from the video to be edited, the video processing device may determine the target object in each designated video frame in the video to be edited, and perform the enlargement processing on the target object. The target object after the enlargement processing can be located in the target image region in the designated video frame. For example, the video processing device can obtain the designated video frame shown in FIG. 8 from the video to be edited, and the video processing device can determine a target object 801 in the designated video frame shown in FIG. 8. The display area 601 of the target object in the preview image shown in FIG. 6 can be set as the target image region, and the enlargement processing can be performed on the target object 801 of the designated video frame in FIG. 8, such that the target object 801 after the enlargement processing can be located in the target image region indicated by 601 in FIG. 6, to obtain the video frame shown in FIG. 10.

In some embodiments, the video processing device may adjust the time sequence of respective designated video frames in the video to be edited according to the preset adjustment rule. The video obtained after adjusting the time sequence can be determined as the target video. The video processing device may adjust respective designated video frames in the target video in the reverse order according to the shooting time sequence, and combine the designated video frames after the adjustment to obtain the target video. For example, edited video frames obtained by the video processing device can be the designated video frames shown in FIGS. 6, 9, and 10. The edited video frames refer to the video frames after being edited as described above. The video processing device can adjust the time sequence of the designated video frames in the target video shown in FIGS. 6, 9, and 10 in the reverse order according to the shooting time sequence. The output can be started from the video frame shown in FIG. 10, followed by the video frame shown in FIG. 9, and finally the video frame shown in FIG. 6.

Consistent with the disclosure, the video processing device can obtain the target object from the obtained preview image, and determine the display position of the target object in the preview image. By obtaining the video to be edited shot by the photographing device during the movement of the aircraft, the video processing device can obtain the first video frame from the video to be edited. The image position of the target object in the second video frame of the video to be edited can be adjusted according to the image position of the target object in the first video frame, such that the target video can be obtained. Therefore, an automatic video editing processing can be realized, and the video processing efficiency can be improved.

Figure 11:
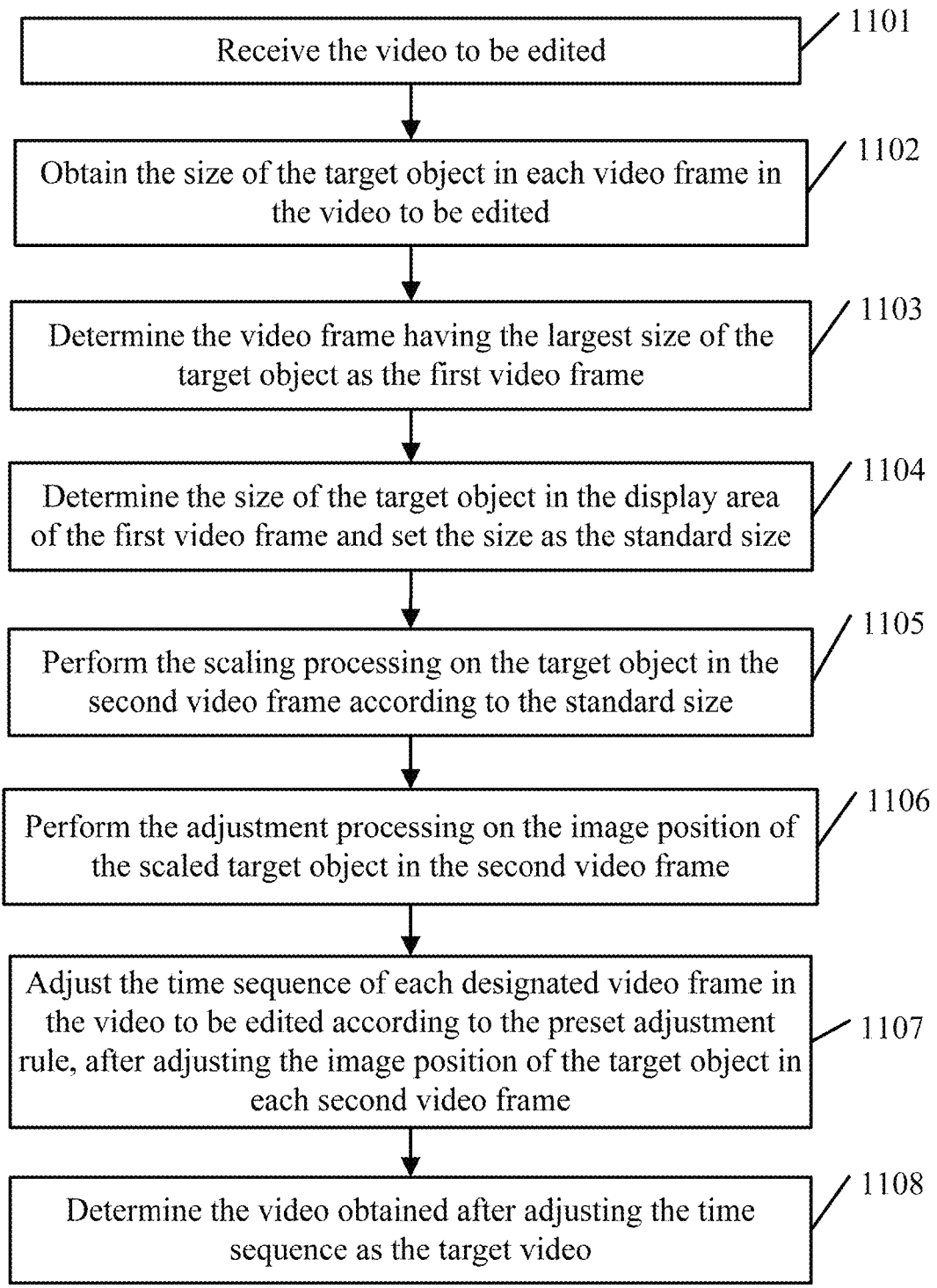
FIG. 11 is a schematic flow chart of another video processing method consistent with embodiments of the disclosure.

FIG. 11 is a schematic flow chart of another example video processing method consistent with the disclosure. The method can be implemented by a video processing device, for example, the video processing device 11 described above.

As shown in FIG. 11, at S1101, the video to be edited is received. In some embodiments, the video to be edited refers to the video including the target object shot by the photographing device mounted at the aircraft, when the aircraft is in the specific flight mode. The position of the target object in each image of the video remains unchanged, and the size of the target object in each image can be changed. Before receiving the video to be edited, the video processing device can obtain the preview image shot by the photographing device mounted at the aircraft, and obtain the target object from the obtained preview image.

In some embodiments, before receiving the video to be edited, the video processing device can receive the frame-selection operation on the target object on the preview image. The preview image was shot by the photographing device mounted at the aircraft. The target frame-selection region can be determined according to the frame-selection operation. In the video to be edited shot by the photographing device during the flight of the aircraft, the target object can be within the target frame-selection region. For example, the video processing device can control the photographing device mounted at the aircraft to shoot, and control the gimbal to face the target object, such that the photographing device can shoot the preview image. Based on the user's frame-selection operation on the target object in the preview image on the user interface of the video processing device, the target frame-selection region of the target object can be determined from the obtained preview image. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's frame-selection operation on the target object in the preview image on the user interface of the video processing device, the image region 201 determined by the frame-selection operation can be used as the target frame-selection region of the target object.

It can be appreciated that the frame-selection operation is merely an example of the operation performed by the user on the target object in the preview image on the user interface of the video processing device. The user's operation on the target object in the preview image on the user interface of the video processing device may include other operations. The user's operation on the target object in the preview image on the user interface of the video processing device is not limited herein.

In some embodiments, the video processing device can obtain the position information of the click operation on the target object in the preview image. The preview image can be shot by the photographing device mounted at the aircraft, and the target frame-selection region can be determined based on the position information of the click operation. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's click operation on the target object in the preview image on the user interface of the video processing device, the position information of the click operation can be obtained. According to the position information of the click operation, the target frame-selection region 201 can be determined as the target frame-selection region of the target object. In the video to be edited shot by the photographing device during the flight of the aircraft, the target object can be within the target frame-selection region.

In some embodiments, the video processing device can obtain the video to be edited shot by the photographing device during the movement of the aircraft. For example, the video processing device can control the movement of the aircraft mounted with the photographing device by obtaining the shooting instruction, and shoot the video to be edited during the movement. Referring again to FIG. 3, after the user interface of the video processing device obtains the target object, the execution button "GO" 301 shown in FIG. 3 and the cancel button 302 shown in the FIG. 3 can appear on the user interface. When the video processing device receives the user's click on the execution button "GO", the video processing device can obtain the shooting instruction. As such, the aircraft mounted with the photographing device can be controlled to move, and the video to be edited can be obtained during the movement of the aircraft.

In some embodiments, the video processing device can control the aircraft mounted with the photographing device to control the movement of the aircraft according to the preset movement rule, such that the photographing device can shoot the video. Thereby, the video processing device can obtain the video to be edited shot by the photographing device during the movement of the aircraft. The preset movement rule can include controlling the movement of the aircraft by determining one or two of the shooting start position and the shooting end point position.

In some embodiments, the video processing device may control the aircraft to move from the current position to the shooting end point position by determining the shooting end point position. For example, the video processing device can determine the shooting end point position and control the aircraft to move from the current position to the shooting end point position. The shooting end point can be in the direction away from the target object.

In some embodiments, the video processing device may control the aircraft to move from the shooting start position to the shooting end position by determining the shooting start position and the shooting end position. The video processing device may receive the first position selection operation and determine the shooting starting position according to the first position selection operation. The video processing device may receive the second position selection operation, and determine the position of the shooting end point according to the second position selection operation. It can be appreciated that the first position selection operation or the second position selection operation may include the position selection operation similar to the click operation, which is not limited herein.

In some embodiments, during the movement of the aircraft, if the video processing device receives the user operation, the current position of the aircraft can be determined as the position of the shooting end point. For example, during the movement of the aircraft, the photographing device can implement the shooting instruction during the movement of the aircraft. If the video processing device receives the user's click operation, the video processing device can determine the current position of the aircraft as the position of the shooting end point, and control the photographing device mounted at the aircraft to stop shooting. The user operation may include the operation, for example, a click operation, a slide operation, or the like, which is not limited herein.

At S1102, the size of the target object in each video frame in the video to be edited is obtained. In some embodiments, the video processing device can obtain that the size of the target object in each video frame in the video to be edited. For example, the video processing device can obtain that the sizes of the target object in the video frames in the video to be edited are 25 cm², 30 cm², 40 cm², and 50 cm².

At S1103, the video frame having the largest size of the target object is determined as the first video frame. In some embodiments, the video processing device can obtain that the size of the target object in each video frame in the video to be edited and determine the video frame having the largest size of the target object is determined as the first video frame. For example, the video processing device can obtain that the sizes of the target object in the video frames in the video to be edited are 25 cm², 30 cm², 40 cm², and 50 cm², and determine the video frame with the largest size 50 cm² of the target object as the first video frame.

In some embodiments, the video processing device may determine the first one of the sequence of video frames in the video to be edited as the first video frame, or determine the last one of the sequence of video frames in the video to be edited as the first video frame. It can be appreciated that the display area of the target object in the first video frame can be determined according to the position of the target frame-selection region.

At S1104, the size of the target object in the display area of the first video frame is determined and set as the standard size. In some embodiments, the video processing device may determine the size of the target object in the display area of the first video frame and set the size as the standard size. For example, the video processing device may determine the size of the target object in the display area of the first video frame as 50 cm², and set 50 cm² as the standard size.

At S1105, the scaling processing is performed on the target object in the second video frame according to the standard size. In some embodiments, the video processing device may determine the size of the target object in the display area of the first video frame, set the size as the standard size, and perform the scaling processing on the target object in the second video frame according to the standard size. For example, the video processing device may determine the size of the target object in the display area of the first video frame, set the size as the standard size, and perform the enlargement processing or a reduce processing on the target object in the second video frame according to the standard size. As such, the size of the target object in the processed second video frame can be the same as the standard size. In some embodiments, the video processing device may perform the scaling processing on the entire image area of the second video frame according to the standard size.

In some embodiments, the video processing device can enlarge the entire image area of the second video frame in the video to be edited according to the standard size, and cut off the edge area of the enlarged second video frame, such that the size of the display area of the second video frame after being clipped can be the same as the size of the display area of the first video frame.

At S1106, the adjustment processing is performed on the image position of the scaled target object in the second video frame. In some embodiments, the video processing device may adjust the image position of the scaled target object in the second video frame of the video to be edited according to the display area.

In some embodiments, the video processing device may perform the adjustment processing on the designated video frames in the obtained video to be edited to obtain the target video. The designated video frames can include some or all of the video frames to be edited. For example, after obtaining the video to be edited, the video processing device may select some video frames from the video to be edited as the designated video frames. The selection method is not limited herein. In some embodiments, all of the video frames from the video to be edited may be used as the designated video frames, such that the video processing device can perform the adjustment processing on the obtained designated video frames to obtain the target video.

Referring again to FIGS. 6, 7, and 8, the interface shown in FIG. 6 shows the first video frame obtained by the video processing device and the reference numeral 601 represents the display area of the obtained target object in the preview image. The interface shown in FIG. 7 shows the second video frame obtained by the video processing device, and the interface shown in FIG. 8 shows the third video frame obtained by the video processing device. The video frames in FIGS. 6 to 8 can be the video frames shot by the photographing device during the flight when the video processing device send the flight control instruction to the aircraft. The flight control instruction can include the instruction for controlling the aircraft to move in the direction away from the target object, or the flight control instruction can include the instruction for controlling the aircraft to move in the direction toward the target object.

In some embodiments, if the video to be edited is shot when the aircraft flies away from the target object, each designated video frame in the target video can be adjusted in the reverse order according to the shooting time sequence.

In some embodiments, after the video processing device obtains the designated video frames from the video to be edited, the target object may be determined in each designated video frame in the video to be edited, and the enlargement processing can be performed on each designated video frame. The target object can be located in the target image region in each designated video frame after the enlargement process. For example, the video processing device can obtain the designated video frame shown in FIG. 7 from the video to be edited, and the video processing device can determine the target object 701 in the designated video frame shown in FIG. 7. The display area 601 of the target object in the preview image 601 shown in FIG. 6 can be set as the target image region, and the enlargement processing can be performed on the designated video frame in FIG. 7, such that the target object 701 can be located in the target image region of the designated video frame after the enlargement processing to obtain the video frame shown in FIG. 9.

In some embodiments, after obtaining the designated video frames from the video to be edited, the video processing device may determine the target object in each designated video frame in the video to be edited, and perform the enlargement processing on the target object. The target object after the enlargement processing can be located in the target image region in the designated video frame. For example, the video processing device can obtain the designated video frame shown in FIG. 8 from the video to be edited, and the video processing device can determine a target object 801 in the designated video frame shown in FIG. 8. The display area 601 of the target object in the preview image shown in FIG. 6 can be set as the target image region, and the enlargement processing can be performed on the target object 801 of the designated video frame in FIG. 8, such that the target object 801 after the enlargement processing can be located in the target image region indicated by 601 in FIG. 6, to obtain the video frame shown in FIG. 10.

At S1107, after the image position of the target object in each second video frame is adjusted, the time sequence of respective designated video frames in the video to be edited is adjusted according to the preset adjustment rule. In some embodiments, after adjusting the image position of the target object in each second video frame, the video processing device may adjust the time sequence of respective designated video frames in the video to be edited according to the preset adjustment rule.

In some embodiments, the video processing device may adjust respective designated video frames in the target video in the reverse order according to the shooting time sequence, and combine the designated video frames after the adjustment to obtain the target video. For example, the edited video frames obtained by the video processing device can be the designated video frames shown in FIGS. 6, 9, and 10. The video processing device can adjust the time sequence of the designated video frames in the target video shown in FIGS. 6, 9, and 10 in the reverse order according to the shooting time sequence. An output sequence after the adjustment can be can be started from the video frame shown in FIG. 10, followed by the video frame shown in FIG. 9, and finally the video frame shown in FIG. 6.

At S1108, the video obtained after adjusting the time sequence is determined as the target video. In some embodiments, the video processing device may adjust respective designated video frames in the target video in the reverse order according to the shooting time sequence, and combine the designated video frames after the adjustment to obtain the target video. For example, the edited video frames obtained by the video processing device can be the designated video frames shown in FIGS. 6, 9, and 10. The video processing device can adjust the time sequence of the designated video frames in the target video shown in FIGS. 6, 9, and 10 in the reverse order according to the shooting time sequence. The video processing device can sequentially combine the video frames in the order of the video frames shown in FIGS. 10, 9, and 6 to generate the target video.

Consistent with the disclosure, the video processing device can obtain the target object from the obtained preview image, and determine the display position of the target object in the preview image. By obtaining the video to be edited shot by the photographing device during the flight of the aircraft, the video processing device can obtain the first video frame from the video to be edited. The image position of the target object in each second video frame can be adjusted according to the display area of the target object in the first video frame. According to the shooting time sequence, the designated video frames in the video to be edited can be adjusted in the reverse order, such that the target video can be obtained according to the designated video frames after the adjustment. Therefore, the automatic video editing processing can be realized, and the video processing efficiency can be improved.

Figure 12:
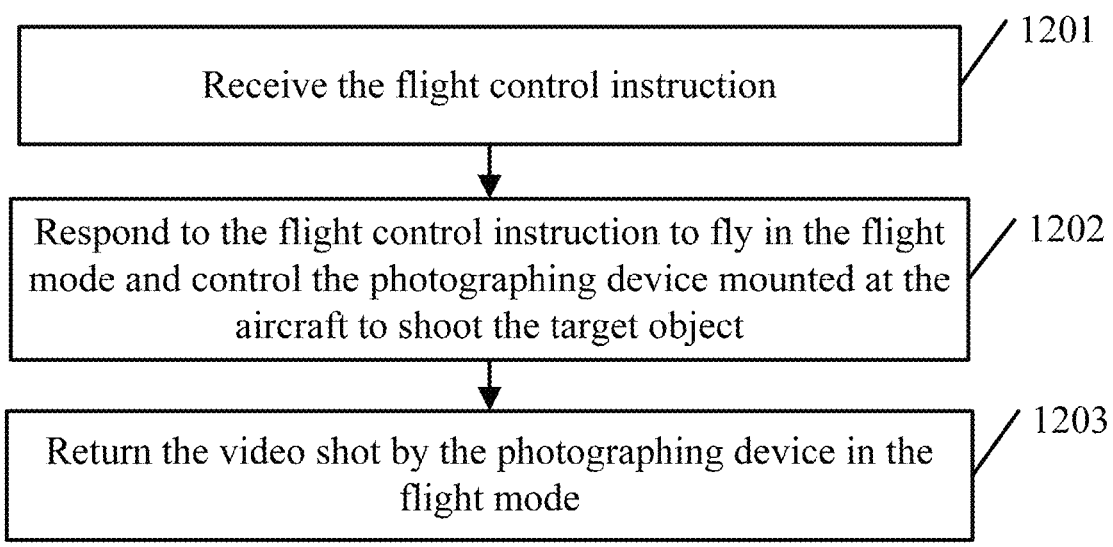
FIG. 12 is a schematic flow chart of another video processing method consistent with embodiments of the disclosure.

FIG. 12 is a schematic flow chart of another example video processing method consistent with the disclosure. The method can be implemented by an aircraft, for example, the aircraft described above.

At S1201, the flight control instruction is received. In some embodiments, the aircraft can receive the flight control instruction. The flight control instruction can indicate a flight mode of the aircraft, and the flight control instruction can include the target object. The flight control instruction can include the instruction for controlling the aircraft to move in the direction away from the target object, or the flight control instruction can include the instruction for controlling the aircraft to move in the direction toward the target object.

In some embodiments, the aircraft can obtain the video to be edited shot by the photographing device during the flight of the aircraft. The first video frame can be determined from the video to be edited, and the display area of the target object in the first video frame can be determined. The image position of the target object in the second video frame of the video to be edited can be adjusted according to the display area to obtain the target video. The image position of the target object located in the adjusted second video frame can be the same as the image position of the display area in the first video frame.

In some embodiments, the video processing device may obtain the size of the target object in each video frame of the video to be edited, and determine the video frame having the largest size of the target object as the first video frame.

In some embodiments, the video processing device can determine the first one of the sequence of video frames in the video to be edited as the first video frame, or determine the last one of the sequence of video frames in the video to be edited as the first video frame.

In some embodiments, the video processing device may determine the size of the target object in the display area of the first video frame, and determine the size as the standard size. The scaling processing can be performed on the target object in the second video frame according to the standard size, and the image position of the target object in the second video frame after the scaling processing can be adjusted according to the position of the display area. In some embodiments, the scaling processing can be performed on the entire image area of the second video frame. The video processing device may adjust respective designated video frames in the target video in the reverse order according to the shooting time sequence. The video obtained after adjusting the time sequence can be determined as the target video.

At S1202, responding to the flight control instruction to fly in the flight mode and control the photographing device mounted at the aircraft to shoot the target object. In some embodiments, the aircraft can respond to the flight control instruction to fly in the flight mode and control the photographing device mounted at the aircraft to shoot the target object. In the flight mode, an attitude of the photographing device can cause the position of the target object in shooting frames to remain unchanged, and the flight trajectory of the aircraft can cause the size of the target object in the shooting frames to change.

The position of the target object in the shooting frames remaining unchanged can refer to that the position of a point of the target object (e.g., a center point) in the shooting frames remains unchanged, or the position of a point of the target object (e.g., the center point) in the target frame-selection region surrounding the target object in the shooting frame remains unchanged.

The flight trajectory of the aircraft changing the size of the target object in the shooting frame can refer to that a distance between the aircraft and the target object during the flight of the aircraft may change, such that the size of the target object in the shooting frames can change.

At S1203, the video shot by the photographing device in the flight mode is returned. In some embodiments, the aircraft can return the video shot by the photographing device in the flight mode to the video processing device, such that the video processing device can perform the adjustment processing on the received video.

Consistent with the disclosure, the aircraft can receive the flight control instruction and response to the flight control instruction to fly in the flight mode and control the photographing device mounted at the aircraft to shoot the target object. The video to be edited shot by the photographing device when the aircraft flies in the flight mode can be sent to the video processing device in real time. Therefore, the automatic video editing processing can be realized, and the video processing efficiency can be improved.

Figure 13:
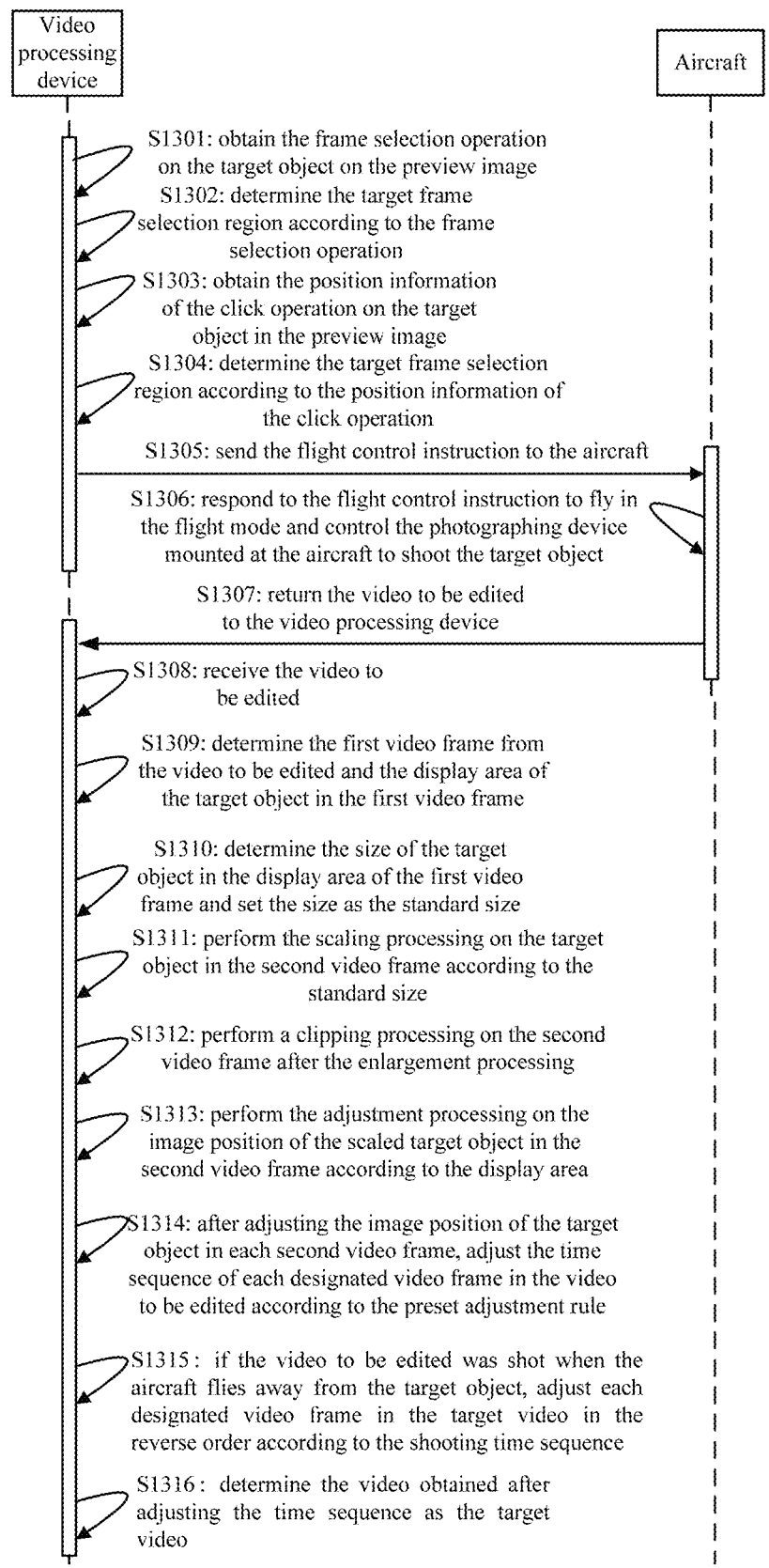
FIG. 13 is a schematic flow chart of another video processing method consistent with embodiments of the disclosure.

FIG. 13 is a schematic flow chart of another example video processing method consistent with the disclosure. The method can be implemented by a video processing device and an aircraft, for example, the video processing device 11 and the aircraft described above. The method includes an interaction between the video processing device and the aircraft. The video processing device can send the flight control instruction to the aircraft. The flight control instruction can indicate the flight mode of the aircraft. The aircraft can respond to the flight control instruction to fly in the flight mode and control the photographing device mounted at the aircraft to shoot the target object. In the flight mode, an attitude of the photographing device can cause the position of the target object in shooting frames to remain unchanged, and the flight trajectory of the aircraft can cause the size of the target object in the shooting frames to change. The aircraft can return the video to be edited shot by the photographing device in the flight mode to the video processing device. The video to be edited refers to the video shot by the photographing device in the flight mode. The video processing device can receive the video to be edited. The video processing device can determine the first video frame from the video to be edited and determine the display area of the target object in the first video frame. The image position of the target object in the second video frame can be adjusted according to the display area of the target object in the first video frame to obtain the target video. The image position of the target object located in the adjusted second video frame can be the same as the image position of the display area in the first video frame.

As shown in FIG. 13, at S1301, the video processing device obtains the frame-selection operation on the target object on the preview image. In some embodiments, the video processing device can obtain the frame-selection operation on the target object on the preview image. The preview image was shot by the photographing device mounted at the aircraft. In the video to be edited shot by the photographing device during the flight of the aircraft, the target object can be within the target frame-selection region.

At S1302, the video processing device determines the target frame-selection region according to the frame-selection operation. In some embodiments, the video processing device can determine the target frame-selection region according to the frame-selection operation. The video processing device can obtain the frame-selection operation on the target object on the preview image. The preview image was shot by the photographing device mounted at the aircraft. The target frame-selection region can be determined according to the frame-selection operation. In the video to be edited shot by the photographing device during the flight of the aircraft, the target object can be within the target frame-selection region. For example, the video processing device can control the photographing device mounted at the aircraft to shoot, and control the gimbal to face the target object, such that the photographing device can shoot the preview image. Based on the user's frame-selection operation on the target object in the preview image on the user interface of the video processing device, the target frame-selection region of the target object can be determined from the obtained preview image. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's frame-selection operation on the target object in the preview image on the user interface of the video processing device, the image region 201 determined by the frame-selection operation can be used as the target frame-selection region of the target object.

It can be appreciated that the frame-selection operation is merely an example of the operation performed by the user on the target object in the preview image on the user interface of the video processing device. The user's operation on the target object in the preview image on the user interface of the video processing device may include other operations. The user's operation on the target object in the preview image on the user interface of the video processing device is not limited herein.

At S1303, the video processing device obtains the position information of the click operation on the target object in the preview image. In some embodiments, the video processing device can obtain the position information of the click operation on the target object in the preview image. The preview image was shot by the photographing device mounted at the aircraft. The target frame-selection region can be determined based on the position information of the click operation. In the video to be edited shot by the photographing device during the flight of the aircraft, the target object can be within the target frame-selection region.

At S1304, the video processing device determines the target frame-selection region according to the position information of the click operation. In some embodiments, the video processing device can determine the target frame-selection region according to the position information of the click operation. The video processing device can obtain the position information of the click operation on the target object in the preview image. The preview image can be shot by the photographing device mounted at the aircraft, and the target frame-selection region can be determined based on the position information of the click operation. In the video to be edited shot by the photographing device during the flight of the aircraft, the target object can be within the target frame-selection region. Referring again to FIG. 2, FIG. 2 shows the preview image obtained by the video processing device by controlling the photographing device to shoot. Based on the user's click operation on the target object in the preview image on the user interface of the video processing device, the position information of the click operation can be obtained. According to the position information of the click operation, the target frame-selection region 201 can be determined as the target frame-selection region of the target object. In the video to be edited shot by the photographing device during the flight of the aircraft, the target object can be within the target frame-selection region.

At S1305, the video processing device sends the flight control instruction to the aircraft. In some embodiments, the video processing device can send the flight control instruction to the aircraft. The flight control instruction can indicate the flight mode of the aircraft, for example, an auto zoom mode.

At S1306, the aircraft responds to the flight control instruction to fly in the flight mode and control the photographing device mounted at the aircraft to shoot the target object. In some embodiments, the aircraft can respond to the flight control instruction to fly in the flight mode and control the photographing device mounted at the aircraft to shoot the target object. In the flight mode, the attitude of the photographing device can cause the position of the target object in shooting frames to remain unchanged, and the flight trajectory of the aircraft can cause the size of the target object in the shooting frames to change.

At S1307, the aircraft returns the video to be edited to the video processing device. In some embodiments, the aircraft can return the video to be edited to the video processing device. The video to be edited refers to the video shot by the photographing device when the aircraft in the flight mode.

At S1308, the video processing device receives the video to be edited. In some embodiments, the video processing device can receive the video to be edited from the aircraft.

At S1309, the video processing device determines the first video frame from the video to be edited and the display area of the target object in the first video frame. In some embodiments, the video processing device can determine the first video frame from the video to be edited, and determine the display area of the target object in the first video frame. For example, the video processing device can determine the position information of the display area of the target object in the preview image from the obtained preview image. The position information can include one or more pieces of information, for example, the size, area, coordinate information, the ratio of the target object to the preview image, and the like. The preview image can be obtained by the video processing device by controlling the photographing device mounted at the aircraft to shoot. The target object can be obtained by the video processing device from the obtained preview image based on the user's operation on the user interface of the video processing device. Referring again to FIG. 2, for example, the video processing device can determine that the region 201 is 10 cm in length and 15 cm in width based on the obtained region 201 used as the target object.

At S1310, the video processing device determines the size of the target object in the display area of the first video frame, and sets the size as the standard size. In some embodiments, the video processing device can determine the size of the target object in the display area of the first video frame, and set the size as the standard size.

In some embodiments, the video processing device may determine the video frame having the largest size of the target object as the first video frame by obtaining the size of the target object in each video frame in the video to be edited. For example, the video processing device can obtain that the sizes of the target object in the video frames in the video to be edited are 25 cm$^2$, 30 cm$^2$, 40 cm$^2$, and 50 cm$^2$, and determine the video frame with the largest size 50 cm$^2$ of the target object as the first video frame.

In some embodiments, the video processing device may determine the first one of the sequence of video frames in the video to be edited as the first video frame, or determine the last one of the sequence of video frames in the video to be edited as the first video frame. It can be appreciated that the display area of the target object in the first video frame can be determined according to the position of the target frame-selection region.

At S1311, the video processing device performs the scaling processing on the target object in the second video frame according to the standard size. In some embodiments, the video processing device can perform the scaling processing on the target object in the second video frame according to the standard size. The video processing device may determine the size of the target object in the display area of the first video frame, set the size as the standard size, and perform the scaling processing on the target object in the second video frame according to the standard size.

At 1312, the video processing device performs a clipping processing on the second video frame after the enlargement processing. In some embodiments, the video processing device can perform the clipping processing on the second video frame after the enlargement processing. For example, if it is detected that the video processing device performs the enlargement processing on the target object in the second video frame according to the standard size, the video processing device can perform the clipping processing on the second video frame after the enlargement processing. As such, the size of the display area of the second video frame after being clipped can be the same as the size of the display area of the first video frame.

At S1313, the video processing device performs the adjustment processing on the image position of the scaled target object in the second video frame according to the display area. In some embodiments, the video processing device can perform the adjustment processing on the image position of the scaled target object in the second video frame according to the display area.

In some embodiments, the video processing device may perform the adjustment processing on the designated video frames in the obtained video to be edited to obtain the target video. The designated video frames can include some or all of the video frames to be edited. For example, after obtaining the video to be edited, the video processing device may select some video frames from the video to be edited as the designated video frames. The selection method is not limited herein. In some embodiments, all of the video frames from the video to be edited may be used as the designated video frames, such that the video processing device can perform the adjustment processing on the obtained designated video frames to obtain the target video.

Referring again to FIGS. 6, 7, and 8, the interface shown in FIG. 6 shows the first video frame obtained by the video processing device and the reference numeral 601 represents the display area of the obtained target object in the preview image. The interface shown in FIG. 7 shows the second video frame obtained by the video processing device, and the interface shown in FIG. 8 shows the third video frame obtained by the video processing device. The video frames in FIGS. 6 to 8 can be the video frames shot by the photographing device during the flight when the video processing device send the flight control instruction to the aircraft. The flight control instruction can include the instruction for controlling the aircraft to move in the direction away from the target object, or the flight control instruction can include the instruction for controlling the aircraft to move in the direction toward the target object.

In some embodiments, after the video processing device obtains the designated video frames from the video to be edited, the target object may be determined in each designated video frame in the video to be edited, and the enlargement processing can be performed on each designated video frame. The target object can be located in the target image region in each designated video frame after the enlargement process. For example, the video processing device can obtain the designated video frame shown in FIG. 7 from the video to be edited, and the video processing device can determine the target object 701 in the designated video frame shown in FIG. 7. The display area 601 of the target object in the preview image shown in FIG. 6 can be set as the target image region, and the enlargement processing can be performed on the designated video frame in FIG. 7, such that the target object 701 can be located in the target image region of the designated video frame after the enlargement processing to obtain the video frame shown in FIG. 9.

In some embodiments, after obtaining the designated video frames from the video to be edited, the video processing device may determine the target object in each designated video frame in the video to be edited, and perform the enlargement processing on the target object. The target object after the enlargement processing can be located in the target image region in the designated video frame. For example, the video processing device can obtain the designated video frame shown in FIG. 8 from the video to be edited, and the video processing device can determine a target object 801 in the designated video frame shown in FIG. 8. The display area 601 of the target object in the preview image shown in FIG. 6 can be set as the target image region, and the enlargement processing can be performed on the target object 801 of the designated video frame in FIG. 8, such that the target object 801 after the enlargement processing can be located in the target image region indicated by 601 in FIG. 6, to obtain the video frame shown in FIG. 10.

At S1314, after adjusting the image position of the target object in each second video frame, the video processing device adjusts the time sequence of respective designated video frames in the video to be edited according to the preset adjustment rule. In some embodiments, after adjusting the image position of the target object in each second video frame, the video processing device can adjust the time sequence of respective designated video frames in the video to be edited according to the preset adjustment rule.

At S1315, if the video to be edited was shot when the aircraft flies away from the target object, the video processing device adjusts respective designated video frames in the target video in the reverse order according to the shooting time sequence. In some embodiment, if the video to be edited was shot when the aircraft flies away from the target object, the video processing device can adjust respective designated video frames in the target video in the reverse order according to the shooting time sequence.

In some embodiments, the video processing device can adjust respective designated video frames in the target video in the reverse order according to the shooting time sequence. Referring again to FIGS. 6, 9, and 10, the video processing device can adjust the time sequence of the designated video frames in the target video shown in FIGS. 6, 9, and 10 in the reverse order according to the shooting time sequence. The output sequence after the adjustment can be started from the video frame shown in FIG. 10, followed by the video frame shown in FIG. 9, and finally the video frame shown in FIG. 6.

At S1316, the video processing device determines the video obtained after adjusting the time sequence as the target video. In some embodiments, the video processing device can determine the video obtained after adjusting the time sequence as the target video.

In some embodiments, the video processing device may adjust respective designated video frames in the target video in the reverse order according to the shooting time sequence, and combine the designated video frames after the adjustment to obtain the target video. For example, the edited video frames obtained by the video processing device can be the designated video frames shown in FIGS. 6, 9, and 10. The video processing device can adjust the time sequence of the designated video frames in the target video shown in FIGS. 6, 9, and 10 in the reverse order according to the shooting time sequence. The video processing device can sequentially combine the video frames in the order of the video frames shown in FIGS. 10, 9, and 6 to generate the target video.

Consistent with the disclosure, the video processing device can send the flight control instruction to the aircraft. The aircraft can response to the flight control instruction to fly in the flight mode and control the photographing device mounted at the aircraft to shoot the target object. The video processing device can receive the video to be edited and determine the first video frame from the video to be edited and the display area of the target object in the first video frame. The image position of the target object in each second video frame can be adjusted according to the display area of the target object in the first video frame to obtain the target video. Therefore, the automatic video editing processing can be realized, and the video processing efficiency can be improved.

Figure 14:
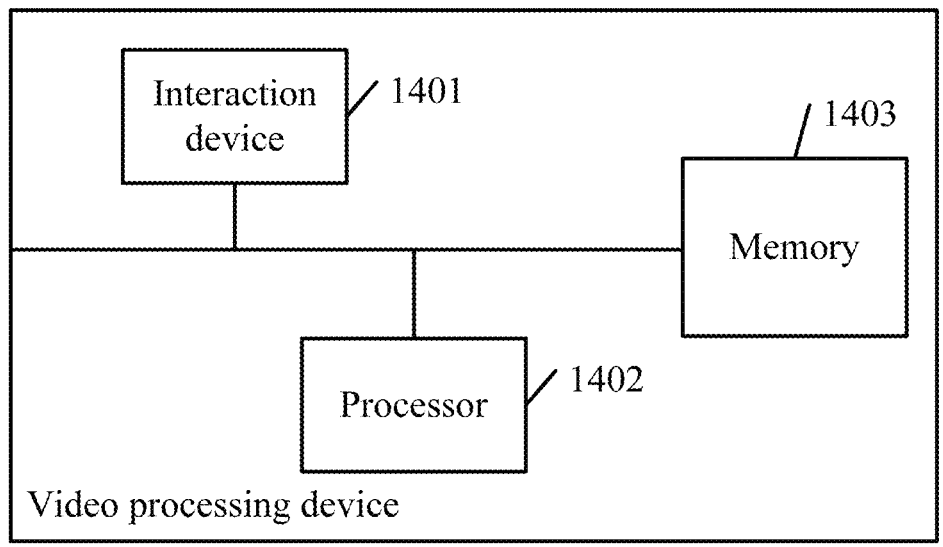
FIG. 14 is a schematic structural diagram of a video processing device consistent with embodiments of the disclosure.

FIG. 14 is a schematic structural diagram of an example video processing device consistent with the disclosure. As shown in FIG. 14, the video processing device includes an interaction device 1401, a processor 1402, and a memory 1403. The interactive device 1401 can be configured to interact with the user. The interactive device may include one or more of a touch display screen, a keyboard, keys, a joystick, and a pulsator. The interactive device may include the user interface.

The interaction device 1401 can be configured to process interaction data generated for the user, and include components such as a touch display screen. The memory 1403 may include a volatile memory, a non-volatile memory, or a combination of thereof. The processor 1402 may include a central processing unit (CPU) or a hardware chip. The hardware chip may include an application-specific integrated circuit (ASIC), a programmable logic device (PLD), or a combination thereof. The PLD may include a complex programmable logic device (CPLD), a field-programmable gate array (FPGA), or a combination thereof.

In some embodiments, the memory 1403 can be configured to store program instructions. The processor 1402 can call the program instructions stored in the memory 1403 to perform the following processes. The processor 1402 can be configured to receive the video to be edited. The video to be edited refers to the video including the target object shot by the photographing device mounted at the aircraft, when the aircraft is in the specific flight mode. The position of the target object in each image of the video remains unchanged, and the size of the target object in each image can be changed.

The processor 1402 can be further configured to determine the first video frame from the video to be edited and the display area of the target object in the first video frame, and adjust the image position of the target object in the second video frame according to the display area of the target object in the first video frame to obtain the target video. The image position of the target object located in the adjusted second video frame can be the same as the image position of the display area in the first video frame.

In some embodiments, the processor 1402 can call the program instructions stored in the memory 1403, and be configured to obtain the size of the target object in each video frame of the video to be edited, and determine the video frame having the largest size of the target object as the first video frame.

In some embodiments, the processor 1402 can call the program instructions stored in the memory 1403, and be configured to determine the first one of the sequence of video frames in the video to be edited as the first video frame, or determine the last one of the sequence of video frames in the video to be edited as the first video frame.

In some embodiments, the processor 1402 can call the program instructions stored in the memory 1403, and be configured to obtain the frame-selection operation on the target object on the preview image, and determine the target frame-selection region according to the frame-selection operation. The preview image was shot by the photographing device mounted at the aircraft. In the video to be edited shot by the photographing device during the flight of the aircraft, the target object can be within the target frame-selection region.

In some embodiments, the processor 1402 can call the program instructions stored in the memory 1403, and be configured to obtain the position information of the click operation on the target object in the preview image, and determine the target frame-selection region according to the position information of the click operation. The preview image was shot by the photographing device mounted at the aircraft. In the video to be edited shot by the photographing device during the flight of the aircraft, the target object can be within the target frame-selection region. In some embodiments, the display area of the target object in the first video frame can be determined according to the position of the target frame-selection region.

In some embodiments, the processor 1402 can call the program instructions stored in the memory 1403, and be configured to determine the size of the target object in the display area of the first video frame, set the size as the standard size, perform the scaling processing on the target object in the second video frame according to the standard size, and perform the adjustment processing on the image position of the scaled target object in the second video frame according to the display area.

In some embodiments, the processor 1402 can call the program instructions stored in the memory 1403, and be configured to perform the enlargement process on the entire image area of the second video frame according to the standard size, and perform the clipping processing on the second video frame after the enlargement processing. The size of the display area of the second video frame after being clipped can be the same as the size of the display area of the first video frame.

In some embodiments, the processor 1402 can call the program instructions stored in the memory 1403, and be configured to perform the adjustment processing on the image position of the scaled target object in the second video frame according to the display area, after adjusting the image position of the target object in each second video frame, adjust the time sequence of respective designated video frames in the video to be edited according to the preset adjustment rule, and determine the video obtained after adjusting the time sequence as the target video.

In some embodiments, the processor 1402 can call the program instructions stored in the memory 1403, and be configured to adjust respective designated video frames in the target video in the reverse order according to the shooting time sequence.

In some embodiments, the processor 1402 can call the program instructions stored in the memory 1403, and configured, if the video to be edited was shot when the aircraft flies away from the target object, to adjust respective designated video frames in the target video in the reverse order according to the shooting time sequence.

In some embodiments, the processor 1402 can call the program instructions stored in the memory 1403, and be configured to send the flight control instruction to the aircraft. The flight control instruction can be implemented to control the flight of the aircraft. The flight control instruction can include the instruction for controlling the aircraft to move in the direction away from the target object, or the flight control instruction can include the instruction for controlling the aircraft to move in the direction toward the target object.

The implementation of the processor 1402 is similar to that of the example methods described above, and detailed description thereof is omitted herein.

Consistent with the disclosure, the video processing device can obtain the target object from the obtained preview image, and determine the display position of the target object in the preview image. By obtaining the video to be edited shot by the photographing device during the flight of the aircraft, the video processing device can obtain the first video frame from the video to be edited. The image position of the target object in each second video frame can be adjusted according to the display area of the target object in the first video frame. Therefore, the automatic video editing processing can be realized, and the video processing efficiency can be improved.

The present disclosure also provides an aircraft including a body, a power system provided at the body and configured to provide the flight power, and a processor configured to receive the flight control instruction. The flight control instruction can indicate the flight mode of the aircraft, and the flight control instruction can include the target object. The processor can be further configured to respond to the flight control instruction to fly in the flight mode and control the photographing device mounted at the aircraft to shoot the target object. In the flight mode, the attitude of the photographing device can cause the position of the target object in shooting frames to remain unchanged, and the flight trajectory of the aircraft can cause the size of the target object in the shooting frames to change. The processor can be further configured to return the video shot by the photographing device in the flight mode.

In some embodiments, the flight control instruction can include the instruction for controlling the aircraft to move in the direction away from the target object, or the flight control instruction can include the instruction for controlling the aircraft to move in the direction toward the target object.

In some embodiments, the processor can be further configured to receive the video to be edited. The video to be edited refers to the video including the target object shot by the photographing device mounted at the aircraft, when the aircraft is in the specific flight mode. The processor can be further configured to determine the first video frame from the video to be edited and the display area of the target object in the first video frame, and adjust the image position of the target object in the second video frame according to the display area of the target object in the first video frame to obtain the target video. The image position of the target object located in the adjusted second video frame can be the same as the image position of the display area in the first video frame.

The implementation of the processor in the aircraft is similar to that of the example methods described above, and detailed description thereof is omitted herein. The UAV can include a rotary-wing UAV, such as a quad-rotor UAV, a six-rotor UAV, or an eight-rotor UAV, or can include a fixed-wing UAV. The UAV can include a power system configured to provide the flight power for the UAV. The power system can include one or more of a propeller, a motor, and an ESC. The motor can be configured to drive the aircraft propeller, and the ESC can be configured to control the speed of the motor of the aircraft.

The present disclosure further provides a video processing system including a video processing device and an aircraft. The video processing device can be configured to send the flight control instruction to the aircraft. The flight control instruction can indicate the flight mode of the aircraft.

The aircraft can be configured to respond to the flight control instruction to fly in the flight mode and control the photographing device mounted at the aircraft to shoot the target object. In the flight mode, the attitude of the photographing device can cause the position of the target object in shooting frames to remain unchanged, and the flight trajectory of the aircraft can cause the size of the target object in the shooting frames to change. The aircraft can be further configured to return the video to be edited to the video processing device. The video to be edited refers to the video shot by the photographing device in the flight mode.

The video processing device can be further configured to receive the video to be edited, determine the first video frame from the video to be edited and the display area of the target object in the first video frame, and adjust the image position of the target object in the second video frame according to the display area of the target object in the first video frame to obtain the target video. The image position of the target object located in the adjusted second video frame can be the same as the image position of the display area in the first video frame.

In some embodiment, the video processing device can be further configured to obtain the size of the target object in each video frame of the video to be edited, and determine the video frame having the largest size of the target object as the first video frame.

In some embodiment, the video processing device can be further configured to determine the first one of the sequence of video frames in the video to be edited as the first video frame, or determine the last one of the sequence of video frames in the video to be edited as the first video frame.

In some embodiment, the video processing device can be further configured to obtain the frame-selection operation on the target object on the preview image, and determine the target frame-selection region according to the frame-selection operation. The preview image was shot by the photographing device mounted at the aircraft. In the video to be edited shot by the photographing device during the flight of the aircraft, the target object can be within the target frame-selection region.

In some embodiment, the video processing device can be further configured to obtain the position information of the click operation on the target object in the preview image, and determine the target frame-selection region according to the position information of the click operation. The preview image was shot by the photographing device mounted at the aircraft. In the video to be edited shot by the photographing device during the flight of the aircraft, the target object can be within the target frame-selection region. In some embodiments, the display area of the target object in the first video frame can be determined according to the position of the target frame-selection region.

In some embodiment, the video processing device can be further configured to determine the size of the target object in the display area of the first video frame, set the size as the standard size, perform the scaling processing on the target object in the second video frame according to the standard size, and perform the adjustment processing on the image position of the scaled target object in the second video frame according to the display area.

In some embodiment, the video processing device can be further configured to perform the enlargement process on the entire image area of the second video frame according to the standard size, and perform the clipping processing on the second video frame after the enlargement processing. The size of the display area of the second video frame after being clipped can be the same as the size of the display area of the first video frame.

In some embodiment, the video processing device can be further configured to perform the adjustment processing on the image position of the scaled target object in the second video frame according to the display area, after adjusting the image position of the target object in each second video frame, adjust the time sequence of respective designated video frames in the video to be edited according to the preset adjustment rule, and determine the video obtained after adjusting the time sequence as the target video.

In some embodiment, the video processing device can be further configured to adjust respective designated video frames in the target video in the reverse order according to the shooting time sequence.

In some embodiment, the video processing device can be further configured, if the video to be edited was shot when the aircraft flies away from the target object, to adjust respective designated video frames in the target video in the reverse order according to the shooting time sequence.

In some embodiments, the flight control instruction can include the instruction for controlling the aircraft to move in the direction away from the target object, or the flight control instruction can include the instruction for controlling the aircraft to move in the direction toward the target object.

The present disclosure also provides a computer-readable storage. The computer-readable storage medium can store a computer program, and the computer program can be executed by a processor to implement a video processing methods consistent with the disclosure, such as one of the example methods described above, or to realize a video processing device consistent with the disclosure, such as one of the example video processing devices described above, and detailed description thereof is omitted herein.

The computer-readable storage medium can include an internal storage unit of the devices consistent with the disclosure, such as a hard disk or a memory of the device. The computer-readable storage medium can also include an external storage device of the device, such as a plug-in hard disk, a smart media card (SMC), and a secure digital (SD) card, a flash card, or the like, provided on the device. The computer-readable storage medium can include both the internal storage unit of the device and the external storage device. The computer-readable storage medium can be configured to store the computer program and other programs and data obtained by the terminal. The computer-readable storage medium can be further configured to temporarily store data that has been or will be outputted.

It is intended that the embodiments disclosed herein are some of the embodiments of the present disclosure and not to limit the scope of the disclosure. Changes, modifications, alterations, and variations of the above-described embodiments may be made by those skilled in the art within the scope of the disclosure.

What is claimed is:

1. A video processing method comprising:
   receiving a video to be edited including a target object and shot by a photographing device mounted at an aircraft;
   determining a first video frame from the video to be edited and determining a display area of the target object in the first video frame; and
   obtaining a target video, including performing an adjustment processing on an image position of the target object in a second video frame of the video to be edited according to the display area, the image position of the target object in the second video frame after being adjusted being the same as an image position of the display area in the first video frame, wherein performing the adjustment processing on the image position of the target object in the second video frame includes:
   determining a size of the target object in the display area of the first video frame;
   setting the size as a standard size;
   performing a scaling processing on the target object in the second video frame according to the standard size, including performing the scaling processing on an entire image area of the second video frame; and
   performing the adjustment processing on the image position of the target object after being scaled in the second video frame according to the display area.

2. The method of claim 1, wherein determining the first video frame from the video to be edited includes:
   obtaining a size of the target object in each video frame of the video to be edited; and
   determining a video frame having a largest size of the target object as the first video frame.

3. The method of claim 1, wherein determining the first video frame from the video to be edited includes:
   determining a first one in a sequence of video frames in the video to be edited as the first video frame; or
   determining a last one in the sequence of video frames in the video to be edited as the first video frame.

4. The method of claim 1, further comprising, before receiving the video to be edited:
   performing a frame-selection operation on the target object in a preview image shot by the photographing device to determine a target frame-selection region, the target object being located within the target frame-selection region.

5. The method of claim 4, wherein the display area of the target object in the first video frame is determined according to a position of the target frame-selection region.

6. The method of claim 1, further comprising, before receiving the video to be edited:
   obtaining position information of a click operation on the target object in a preview image shot by the photographing device; and
   determining a target frame-selection region according to the position information of the click operation, the target object being located within the target frame-selection region.

7. The method of claim 1, wherein performing the scaling processing on the entire image area of the second video frame includes:
   performing an enlargement processing on the entire image area of the second video frame according to the standard size; and
   performing a clipping processing on the second video frame being enlarged, a size of the display area of the second video frame after being clipped being the same as a size of the display area of the first video frame.

8. The method of claim 1, wherein obtaining the target video further includes:
   after performing the adjustment processing on the image position of the target object in the second video frame, adjusting a time sequence of respective designated video frames in the video to be edited according to a preset adjustment rule; and
   determining the video obtained after adjusting the time sequence as the target video.

9. The method of claim 8, wherein adjusting the time sequence of the respective designated video frames in the video to be edited includes adjusting the respective designated video frames in the video to be edited in a reverse order according to a shooting time sequence.

10. The method of claim 9, wherein adjusting the respective designated video frames in the video to be edited in the reverse order includes adjusting the respective designated video frames in the video to be edited in the reverse order according to the shooting time sequence in response to that the video to be edited is shot while the aircraft flies away from the target object.

11. The method of claim 1, further comprising:
    sending a flight control instruction to the aircraft, the flight control instruction being configured to control a flight of the aircraft.

12. The method of claim 11, wherein the flight control instruction includes:
    an instruction for controlling the aircraft to move in a direction away from the target object; or
    an instruction for controlling the aircraft to move in a direction toward the target object.

13. A video processing method comprising:
    receiving a flight control instruction indicating a flight mode of an aircraft and indicating a target object;
    responding to the flight control instruction, controlling the aircraft to fly in the flight mode and controlling a photographing device mounted at the aircraft to shoot a video of the target object, an attitude of the photographing device being controlled to maintain a position of the target object unchanged in the video, and a flight trajectory of the aircraft being controlled to change a size of the target object in the video;
    determining a first video frame from the video and determining a display area of the target object in the first video frame;
    performing an adjustment processing on an image position of the target object in a second video frame of the video according to the display area, to obtain a target video, the image position of the target object in the second video frame after being adjusted being the same as an image position of the display area in the first video frame; and
    returning the video shot by the photographing device in the flight mode;
    wherein performing the adjustment processing on the image position of the target object in the second video frame includes:
    determining the size of the target object in the display area of the first video frame;
    setting the size as a standard size;

performing a scaling processing on the target object in the second video frame according to the standard size, including performing the scaling processing on an entire image area of the second video frame; and performing the adjustment processing on the image position of the target object after being scaled in the second video frame according to the display area.

14. The method of claim 13, wherein the flight control instruction includes:

an instruction for controlling the aircraft to move in a direction away from the target object; or an instruction for controlling the aircraft to move in a direction toward the target object.

15. A video processing method comprising:

sending, by a video processing device, a flight control instruction to an aircraft, the flight control instruction indicating a flight mode of the aircraft;

responding to the flight control instruction, the aircraft flying in the flight mode and controlling a photographing device mounted at the aircraft to shoot a video of a target object, an attitude of the photographing device being controlled to maintain a position of the target object unchanged in the video, and a flight trajectory of the aircraft being controlled to change a size of the target object in the video;

returning, by the aircraft, the video to the video processing device;

receiving, by the video processing device, the video;

determining, by the video processing device, a first video frame from the video and a display area of the target object in the first video frame; and performing, by the video processing device, an adjustment processing on an image position of the target object in a second video frame of the video according to the display area, to obtain a target video, the image position of the target object in the second video frame after being adjusted being the same as an image position of the display area in the first video frame;

wherein performing the adjustment processing on the image position of the target object in the second video frame includes:

determining the size of the target object in the display area of the first video frame;

setting the size as a standard size;

performing a scaling processing on the target object in the second video frame according to the standard size, including performing the scaling processing on an entire image area of the second video frame; and performing the adjustment processing on the image position of the target object after being scaled in the second video frame according to the display area.

16. The method of claim 15, wherein determining the first video frame from the video includes:

obtaining a size of the target object in each video frame of the video; and determining a video frame having a largest size of the target object as the first video frame.

17. The method of claim 15, wherein determining the first video frame from the video includes:

determining a first one in a sequence of video frames in the video as the first video frame; or determining a last one in the sequence of video frames in the video as the first video frame.

* * * * *